US012294163B2

(12) United States Patent
Jin et al.

(10) Patent No.: US 12,294,163 B2
(45) Date of Patent: May 6, 2025

(54) ANTENNA

(71) Applicants: BOE TECHNOLOGY GROUP CO., LTD., Beijing (CN); Beijing BOE Sensor Technology Co., Ltd., Beijing (CN)

(72) Inventors: Yunnan Jin, Beijing (CN); Zhe Chen, Beijing (CN); Shuo Yang, Beijing (CN); Lei Wang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/016,419

(22) PCT Filed: Feb. 22, 2022

(86) PCT No.: PCT/CN2022/077232

§ 371 (c)(1),
(2) Date: Jan. 16, 2023

(87) PCT Pub. No.: WO2023/159345

PCT Pub. Date: Aug. 31, 2023

(65) Prior Publication Data

US 2024/0258696 A1 Aug. 1, 2024

(51) Int. Cl.
*H01Q 9/04* (2006.01)
*H01Q 1/48* (2006.01)

(52) U.S. Cl.
CPC ............. *H01Q 9/0407* (2013.01); *H01Q 1/48* (2013.01)

(58) Field of Classification Search
CPC .......... H01Q 9/0407; H01Q 9/16; H01Q 9/18; H01Q 9/30; H01Q 9/32; H01Q 9/40
See application file for complete search history.

(56) References Cited

U.S. PATENT DOCUMENTS 5,872,546 A * 2/1999 Ihara ........................ H01Q 9/40 343/893
6,160,515 A * 12/2000 McCoy .................... H01Q 9/42 343/702

(Continued)

FOREIGN PATENT DOCUMENTS

CN 1237278 A 12/1999
CN 1652401 A 8/2005

(Continued)

*Primary Examiner* — Jason M Crawford
(74) *Attorney, Agent, or Firm* — HOUTTEMAN LAW LLC

(57) ABSTRACT

An antenna is provided and includes a bottom plate for being connected with a mounting body and an antenna body on the bottom plate. The antenna body includes: a substrate fixedly connected to the bottom plate; a plane of the substrate intersects the bottom plate; a radiation element on the substrate; a feeding structure configured to transmit and/or receive radio frequency signals to/from the radiation element and including a signal electrode and a ground electrode on a surface of the substrate. The signal electrode is electrically connected to the radiation element. On a reference plane perpendicular to the bottom plate, an orthographic projection of the ground electrode is spaced apart from that of the radiation element, and is entirely located between the orthographic projection of the radiation element and the bottom plate. The antenna can prevent the ground electrode from reflecting the electromagnetic waves radiated by the radiation element.

16 Claims, 11 Drawing Sheets

(56) References Cited

U.S. PATENT DOCUMENTS

| | | | | |
|---|---|---|---|---|
| 6,424,309 | B1 * | 7/2002 | Johnston | H01Q 13/10 343/795 |
| 8,059,054 | B2 * | 11/2011 | Mohammadian | H01Q 1/38 343/700 MS |
| 8,228,254 | B2 * | 7/2012 | Foltz | H01Q 19/32 343/795 |
| 8,228,257 | B2 * | 7/2012 | Lalezari | H01Q 9/28 343/893 |
| 10,148,014 | B2 * | 12/2018 | Suh | H01Q 1/525 |
| 10,446,914 | B2 * | 10/2019 | Hu | H01Q 13/20 |
| 10,677,911 | B2 * | 6/2020 | Wötzel | G01S 13/75 |
| 11,411,306 | B2 * | 8/2022 | Klein | H01Q 21/28 |
| 2005/0162332 | A1 * | 7/2005 | Schantz | H01Q 21/205 343/797 |
| 2006/0061508 | A1 * | 3/2006 | Yanagi | H01Q 1/084 343/773 |
| 2006/0097953 | A1 * | 5/2006 | Regala | H01Q 9/40 343/906 |
| 2006/0170593 | A1 * | 8/2006 | Watts | H01Q 9/0407 343/846 |
| 2007/0285324 | A1 * | 12/2007 | Waterhouse | H01Q 1/273 343/718 |
| 2013/0035050 | A1 | 2/2013 | Gao et al. | |
| 2013/0241794 | A1 * | 9/2013 | Chakravarty | H01Q 9/0457 343/859 |
| 2024/0258696 | A1 * | 8/2024 | Jin | H01Q 9/0407 |

FOREIGN PATENT DOCUMENTS

| | | | |
|---|---|---|---|
| CN | 101859925 | A | 10/2010 |
| CN | 103187626 | A | 7/2013 |
| CN | 104218316 | A | 12/2014 |
| CN | 204067579 | U | 12/2014 |
| CN | 106299612 | A | 1/2017 |
| CN | 106785463 | A | 5/2017 |
| CN | 206349513 | U | 7/2017 |
| CN | 210897621 | U | 6/2020 |
| CN | 113206377 | A | 8/2021 |
| GB | 2453778 | A | 4/2009 |

* cited by examiner

ANTENNA

TECHNICAL FIELD

The present disclosure relates to the communication field, and in particular to an antenna.

BACKGROUND

An antenna is a device capable of enabling an inter-conversion between a radio frequency signal and an electromagnetic wave in a radio frequency band, and is an extremely important component in a communication system. The antenna may include an omnidirectional antenna and a directional antenna according to different directionalities. The omnidirectional antenna has a non-directional electromagnetic wave radiation, and the omnidirectional antenna uniformly radiates electromagnetic waves within 360° in a horizontal direction in an ideal state. The directional antenna has a directional electromagnetic wave radiation, i.e. radiates electromagnetic waves in a certain angular range in the horizontal direction. A parameter, such as a radiation direction of an antenna in a horizontal direction, radiation field coverage of an antenna in a horizontal direction or the like, may be characterized by means of a horizontal radiation pattern. Regardless of an omnidirectional antenna or a directional antenna, the radiation field coverage in the horizontal direction is one of important parameters for showing the performance of the antenna.

In the prior art, an antenna has a structure as shown in FIG. 1, and mainly includes a bottom plate 1, a substrate 2, a radiation element 3 and a signal transmission line 4. The bottom plate 1 is generally horizontally connected to a mounting body (such as an indoor ceiling); the substrate 2 is fixedly connected to the bottom plate 1 in a vertical direction; the radiation element 3 is disposed on the substrate 2; one terminal of the signal transmission line 4 is electrically connected to the radiation element 3, the other terminal of the signal transmission line 4 extends to the bottom plate 1; and the radiation element 3 is electrically connected to a feed-forward circuit of a device including the antenna through the signal transmission line 4. The radiation element 3 is used as a monopole oscillator. In order to supply power to the monopole oscillator, it is generally necessary for the entire bottom plate 1 to be made of a metal material and to be grounded.

However, the bottom plate 1 made of the metal material may reflect electromagnetic waves radiated from the radiation element 3 to a certain extent (as shown in FIG. 2), so that the reflected electromagnetic waves propagate in an upward inclined direction, which results in a reduction of the radiation field coverage in the horizontal direction, indicating that a coverage of a lobe in the horizontal radiation pattern is reduced, and a lobe in a vertical radiation pattern is upwarped, so that the performance of the antenna is adversely affected.

SUMMARY

The present disclosure is directed to solve at least one of the technical problems in the prior art, and provides an antenna, in which a ground electrode is attached to a surface of a substrate, and the ground electrode does not shield a radiation element in a direction parallel to a plane where a bottom plate is located, so as to prevent the ground electrode from reflecting electromagnetic waves radiated from the radiation element, thereby solving a problem that a radiation field in a horizontal direction is adversely affected when the bottom plate is used as a ground component, and advantageously ensuring the performance of the antenna.

An embodiment of the present disclosure provides an antenna, including a bottom plate for being connected with a mounting body and an antenna body on the bottom plate, wherein the antenna body includes: a substrate fixedly connected to the bottom plate; wherein a plane where the substrate is located intersects with the bottom plate; a radiation element on the substrate; and a feeding structure configured to transmit radio frequency signals to the radiation element and/or receive radio frequency signals from the radiation element and including a signal electrode and a ground electrode on a surface of the substrate; wherein the signal electrode is electrically connected to the radiation element; and on a reference plane perpendicular to the bottom plate, an orthographic projection of the ground electrode is spaced apart from an orthographic projection of the radiation element, and is entirely located between the orthographic projection of the radiation element and the bottom plate.

For the antenna according to the embodiment of the present disclosure, the ground electrode is approximately located between the radiation element and the bottom plate, and the ground electrode does not shield the radiation element in a direction parallel to the plane where the bottom plate is located. Normally, the signal electrode is electrically connected to the device including the antenna at the bottom plate, so that it can be considered that a radio frequency current is introduced from the bottom plate. The ground electrode is approximately located between the radiation element and the bottom plate, so that a power supply requirement for the monopole oscillator can be met.

Compared with the embodiment in which a bottom plate is used as a ground component in an antenna in the related art, in the embodiment of the present disclosure, the ground electrode is attached to the surface of the substrate, so that the electromagnetic waves radiated by the radiation element can be effectively prevented from being reflected from below, and the reduction of the radiation field coverage in the direction parallel to the plane where the bottom plate is located due to the reflection is avoided. In addition, the ground electrode does not shield the radiation element in the direction parallel to the plane where the bottom plate is located, so that the electromagnetic waves radiated by the radiation element can be further prevented from being reflected laterally, and the reduction of the radiation field coverage in the direction parallel to the plane where the bottom plate is located and the poor uniformity of the distribution for the radiation field caused by the reflection can be avoided. If the bottom plate is horizontally installed on the mounting body, "the direction parallel to the plane where the bottom plate is located" is the horizontal direction.

Therefore, the ground electrode can realize the grounding without reflecting the electromagnetic waves radiated by the radiation element, so that a propagation direction of the electromagnetic waves is prevented from being changed due to the reflection of the ground electrode, the influence on the radiation field in the horizontal direction is avoided, and the performance of the antenna is ensured.

In some examples, the substrate includes a first surface and a second surface opposite to each other; the ground electrode includes a first ground electrode and a second ground electrode; the signal electrode, the first ground electrode and the second ground electrode are on the first surface; and the first ground electrode and the second ground electrode are on both sides of the signal electrode, respectively, and are spaced from the signal electrode.

In some examples, the radiation element is a radiation patch on the first surface; a first terminal of the signal electrode is electrically connected to the radiation patch; a second terminal of the signal electrode extends to a position close to the bottom plate along a first direction; and the radiation patch and the ground electrode are spaced from each other along the first direction.

In some examples, the radiation patch includes a first edge, a second edge, and a third edge on a side of the radiation patch close to the ground electrode and connected in sequence; and the signal electrode is electrically connected to the second edge; the first ground electrode includes a fourth edge toward the first edge in the first direction; and the second ground electrode includes a fifth edge toward the third edge in the first direction; wherein in a second direction perpendicular to the first direction, a distance between the first edge and the fourth edge gradually increases along a direction away from the signal electrode, and a distance between the third edge and the fifth edge gradually increases along a direction away from the signal electrode.

In some examples, the first edge and the fourth edge are both disposed obliquely in opposite directions with respect to the second direction; and/or the third edge and the fifth edge are both disposed obliquely in opposite directions with respect to the second direction.

In some examples, the first ground electrode further includes a sixth edge toward the second edge in the first direction, the sixth edge is parallel to the second edge; and/or the second ground electrode further includes a seventh edge disposed toward the second edge in the first direction, the seventh edge is parallel to the second edge.

In some examples, a wavelength corresponding to a center frequency of an operating frequency band of the antenna is a reference wavelength; a size of the first edge in the second direction is 0.14 to 0.16 times of the reference wavelength, and/or a size of the third edge in the second direction is 0.14 to 0.16 times of the reference wavelength, and/or a size of the fourth edge in the second direction is 0.25 to 0.27 times of the reference wavelength, and/or a size of the fifth edge in the second direction is 0.25 to 0.27 times of the reference wavelength, and/or a minimum distance between the first edge and the fourth edge is 0.014 to 0.015 times of the reference wavelength, and/or a minimum distance between the third edge and the fifth edge is 0.014 to 0.015 times of the reference wavelength, and/or a maximum distance between the first edge and the fourth edge is 0.27 to 0.3 times of the reference wavelength, and/or a maximum distance between the third edge and the fifth edge is 0.27 to 0.3 times of the reference wavelength.

In some examples, a wavelength corresponding to a center frequency of an operating frequency band of the antenna is a reference wavelength; a size of the radiation patch in the first direction is 0.41 to 0.45 times of the reference wavelength, and/or a size of the radiation patch in the second direction perpendicular to the first direction is 0.55 to 0.6 times of the reference wavelength.

In some examples, the radiation patch is divided into two parts by an extension line of a central line of the signal electrode, and the two parts are of bilateral symmetry with respect to the signal electrode; and/or the first ground electrode and the second ground electrode are of bilateral symmetry with respect to the signal electrode.

In some examples, the substrate includes a first surface and a second surface opposite to each other; the signal electrode is on the first surface; the ground electrode is on the second surface; and the signal electrode and the ground electrode at least partially correspond to each other in a thickness direction of the substrate.

In some examples, the antenna is an omnidirectional antenna; and/or a polarization of the antenna is a vertical polarization.

In some examples, the plane where the substrate is located is perpendicular to the bottom plate; and a surface of the substrate forms the reference plane.

In some examples, the radiation element is a radiation patch; the substrate is transparent; the antenna body further includes a transparent conductive film; the transparent conductive film includes a metal conductive layer, a transparent substrate layer and a transparent adhesive layer sequentially stacked; wherein the metal conductive layer is etched to form the radiation patch, the signal electrode, and the ground electrode in a mesh, so that the radiation patch, the signal electrode, and the ground electrode are all transparent; the transparent adhesive layer is used for adhering with the first surface and/or the second surface of the substrate.

In some examples, a thickness of the metal conductive layer is in a range of 1 micron to 10 microns, and/or a line width of the mesh formed by the metal conductive layer is in a range of 2 microns to 30 microns, and/or a line spacing of the mesh formed by the metal conductive layer is in a range of 50 microns to 200 microns.

In some examples, the antenna further includes a signal transmission structure a signal transmission structure, which penetrates from a side of the bottom plate close to the mounting body to a side of the bottom plate where the antenna body is disposed; wherein the signal transmission structure includes a first conductive portion and a second conductive portion insulated from each other; when the metal conductive layer is etched, a first solid metal portion and a second solid metal portion are formed by remaining, and are electrically connected to the signal electrode and the ground electrode, respectively; the first conductive portion electrically cooperates with the first solid metal portion to enable the signal electrode to transmit radio frequency signals; and the second conductive portion electrically cooperates with the second solid metal portion to enable the ground electrode to be grounded.

In some examples, the antenna further includes an outer cover and a fixing structure; wherein the outer cover is covered above the bottom plate and is covered on the outside of the antenna body; and the fixing structure is used for connecting the antenna body and the bottom plate, and/or for connecting the outer cover and the bottom plate, and/or for connecting the bottom plate and the mounting body; wherein the bottom plate, the outer cover and the fixing structure are all transparent.

In some examples, the fixing structure includes an antenna body positioning element and a fastener; the antenna body positioning element includes a first connection portion and a second connection portion with an angle therebetween; the first connection portion is connected to the first surface and/or the second surface of the substrate through the fastener, and the second connection portion is connected to the bottom plate through the fastener.

DETAIL DESCRIPTION OF EMBODIMENTS

Figure 1:
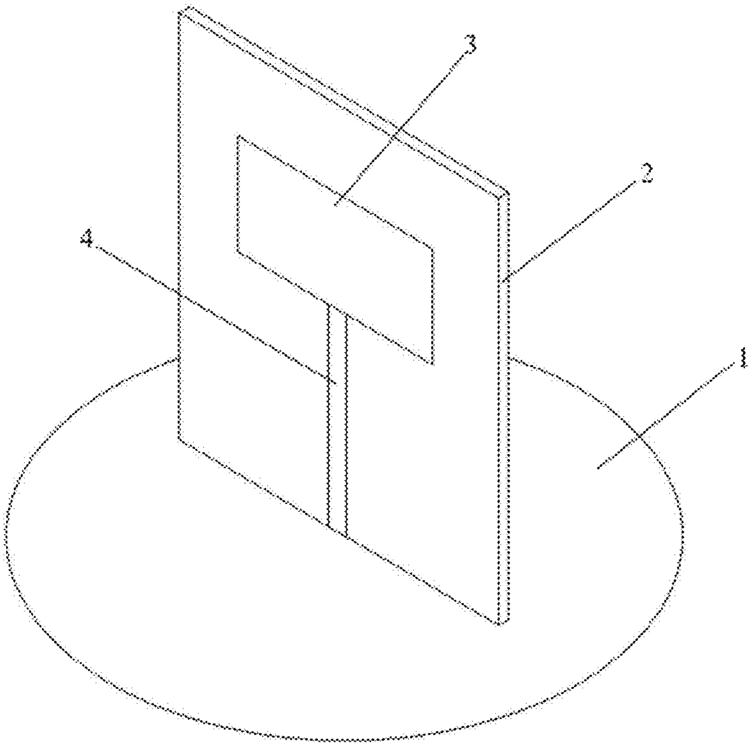
FIG. 1 (Prior Art)
FIG. 1 is a schematic diagram of a structure of an antenna in the related art.

In order to make objects, technical solutions and advantages of the present disclosure more apparent, the present disclosure will be described in further detail with reference to the accompanying drawings. It is apparent that described embodiments are only some, not all, of embodiments of the present disclosure. All other embodiments, which may be obtained by a person skilled in the art without any creative effort based on the embodiments in the present disclosure, belong to the protection scope of the present disclosure.

The shapes and sizes of various elements shown in the drawings are not necessarily drawn to scale, but are merely intended to facilitate an understanding of the embodiments of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

The disclosed embodiments are not limited to the embodiments shown in the drawings, but include modifications of configurations formed based on a manufacturing process. Thus, areas illustrated in the drawings have schematic properties, and shapes of the areas shown in the drawings illustrate specific shapes of the areas of elements, but are not intended to be limiting.

The embodiment of the present disclosure provides an antenna, where a specific type of the antenna is not limited, and the antenna may be an omnidirectional antenna or a directional antenna; an application scenario of the antenna is also not limited, and the antenna may be used in indoor environments and outdoor environments. The antenna may be used as a transmitting antenna and/or a receiving antenna.

Specifically, when the antenna is used as a transmitting antenna, the antenna receives a radio frequency signal fed in by a feed-forward circuit of the device including the antenna, converts the radio frequency signal into an electromagnetic wave in a corresponding frequency band, and radiates the electromagnetic wave into space for propagation. When the antenna is used as a receiving antenna, the antenna receives an electromagnetic wave in a certain frequency band, converts the electromagnetic wave into a corresponding radio frequency signal, and feeds the radio frequency signal into the feed-forward circuit of the device. That is, the receiving process of the antenna can be regarded as an inverse process of the transmitting process. For convenience of description, an operation process of the antenna will be described below by taking the transmitting process of the antenna as an example.

As shown in FIGS. 3, 4, 10 and 11, in some embodiments, the antenna includes a bottom plate 10 for being connected with a mounting body and an antenna body 20 disposed on the bottom plate 10; the antenna body 20 may be mounted by connecting the bottom plate 10 with the mounting body. The specific structure of the mounting body is not limited, and depends on factors, such as an application scenario of the antenna or a way of mounting the antenna, or the like. For example, when the antenna is used in an indoor environment, the mounting body may be an indoor ceiling, or may be a mounting structure provided on an indoor wall and located in an upper indoor space, or the like. For another example, when the antenna is used in an outdoor environment, the mounting body may be a structure that may position the antenna at a high position, such as an antenna mast, an antenna tower, or the like that is provided on the ground.

Further, the antenna body 20 includes a substrate 21, and a radiation element and a feeding structure 23 provided on the substrate 21. The substrate 21 is located on a side of the bottom plate 10 away from the mounting body. The substrate 21 is fixedly connected to the bottom plate 10, and a plane where the substrate 21 is located intersects with the bottom plate 10. That is, the substrate 21 is not parallel to the bottom plate 10. In theory, an angle between the plane where the substrate 21 is located and the bottom plate 10 (i.e., a smaller angle formed between the plane where the substrate 21 is located and the bottom plate 10) is not limited, and may be any angle. In practice, however, considering the ease of assembly between the substrate 21 and the bottom plate 10, the ease of assembly between the substrate 21 and each of the radiation element and the feeding structure 23, a requirement of the radiation element on the arrangement orientation, or other factors, generally, the angle between the plane where the substrate 21 is located and the bottom plate 10 should not be too small, so that the substrate 21 can ideally extend approximately away from the mounting body with respect to the bottom plate 10. For example, the angle between the plane where the substrate 21 is located and the bottom plate 10 is in a range of 60° to 90°, and is preferably 90°. The substrate 21 is mainly used for supporting the radiation element and the feeding structure 23. Therefore, the substrate 21 is generally made of a hard material, so as to ensure support reliability.

The feeding structure 23 is configured to transmit radio frequency signals to the radiation element and/or receive radio frequency signals from the radiation element. It should be noted that the radiation element of the embodiment of the present disclosure is used as a monopole oscillator of the antenna. In order to supply power to the monopole oscillator, it is necessary to provide a ground component in the feeding structure 23. Specifically, the feeding structure 23 includes a signal electrode 231 and a ground electrode 232 disposed on the surface of the substrate 21, and the signal electrode 231 is electrically connected to the radiation element. The signal electrode 231 is mainly used for transmitting radio frequency signals, and the ground electrode 232 is mainly used for grounding. On a reference plane perpendicular to the bottom plate 10, an orthographic projection of the ground electrode 232 is spaced apart from an orthographic projection of the radiation element, and is entirely located between the orthographic projection of the radiation element and the bottom plate 10. That is, the ground electrode 232 is approximately located between the radiation element and the bottom plate 10. The ground electrode 232 does not shield the radiation element in the direction parallel to the plane where the bottom plate 10 is located (if the bottom plate 10 is mounted horizontally, the direction is the horizontal direction).

Normally, the signal electrode 231 is electrically connected to the device including the antenna at the bottom plate 10, so that it can be considered that a radio frequency current is introduced from the bottom plate 10. The ground electrode 232 is approximately located between the radiation element and the bottom plate 10, so that a power supply requirement for the monopole oscillator can be met.

Figure 2:
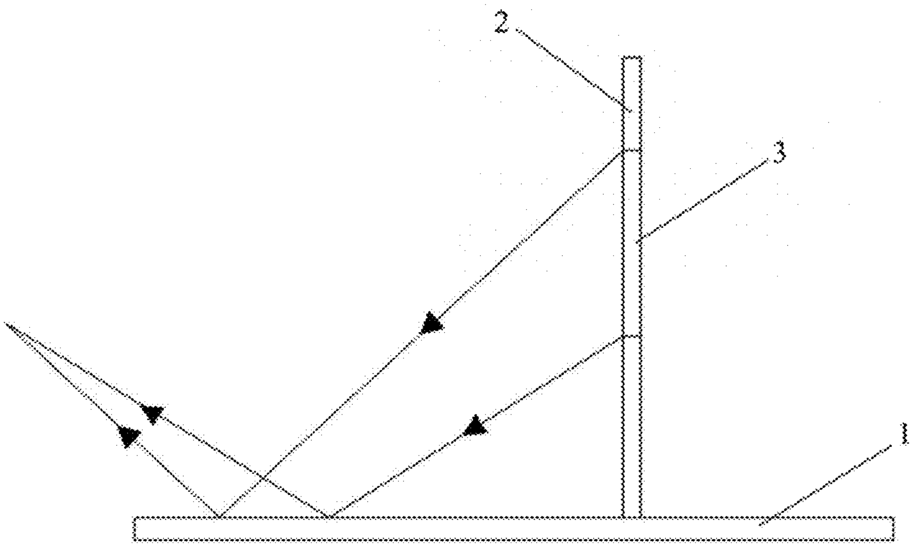
FIG. 2 (Prior Art)
FIG. 2 is a schematic diagram illustrating a state in which a bottom plate of the antenna of FIG. 1 reflects electromagnetic waves radiated from a radiation element of the antenna.

Compared with the embodiment in which a bottom plate 10 is used as a ground component in an antenna in the related art, in the embodiment of the present disclosure, the ground electrode 232 is attached to the surface of the substrate 21, so that the electromagnetic waves radiated by the radiation element can be effectively prevented from being reflected from below, as shown in FIG. 2, and the reduction of the radiation field coverage in the direction parallel to the plane where the bottom plate 10 is located due to the reflection is avoided. In addition, the ground electrode 232 does not shield the radiation element in the direction parallel to the plane where the bottom plate 10 is located, so that the electromagnetic waves radiated by the radiation element can be further prevented from being reflected laterally, and the reduction of the radiation field coverage in the direction parallel to the plane where the bottom plate 10 is located and the poor uniformity of the distribution for the radiation field caused by the reflection can be avoided. If the bottom plate 10 is horizontally installed on the mounting body, "the direction parallel to the plane where the bottom plate 10 is located" is the horizontal direction.

Therefore, the ground electrode 232 can realize the grounding without reflecting the electromagnetic waves radiated by the radiation element, so that a propagation direction of the electromagnetic waves is prevented from being changed due to the reflection of the ground electrode 232, the influence on the radiation field in the horizontal direction is avoided, and the performance of the antenna is ensured.

It should be noted that the specific structure of the radiation element, the connection between the radiation element and the substrate 21, the orientation of the radiation element on the substrate 21, and the like are not limited, as long as the radiation element can realize the feeding in and feeding out of radio frequency signals through the feeding structure 23. In addition, the reference plane is perpendicular to the bottom plate 10. The reference plane may be a virtual plane, and does not actually exist in the antenna, and is only used as a reference for determining a positional relationship between the radiation element and the ground electrode 232. Alternatively, it will be appreciated that the reference plane may also be formed by some structure of the antenna. For example, in some embodiments, the plane where the substrate 21 is located is perpendicular to the bottom plate 10, the substrate 21 has a first surface and a second surface opposite to each other, and one surface (the first surface or the second surface) of the substrate 21 forms the reference plane.

The electromagnetic wave is formed by moving of an electric field and a magnetic field in space in a wave form, wherein the electric field and the magnetic field oscillate in phase and are perpendicular to each other; and the electromagnetic wave has a propagation direction perpendicular to a plane formed by the electric field and the magnetic field. An antenna polarization is a parameter describing a spatial orientation of a vector of an electromagnetic wave radiated by the antenna. A spatial orientation of a vector of an electric field (which may be understood as a direction of the electric field) is generally taken as a polarization direction of the electromagnetic wave radiated by the antenna. It can be understood that the direction of the electric field in the electromagnetic wave radiated by the antenna is related to factors, such as an orientation of the radiation element in space, a direction in which the signal electrode 231 feeds the radio frequency current to the radiation element, or the specific structure of the radiation element, or the like, after the antenna is mounted. Therefore, the factors need to be designed reasonably according to a polarization way required by the antenna.

In some embodiments, the polarization of the antenna is vertical, that is, the direction of the electric field in the electromagnetic wave radiated by the radiation element is perpendicular to the ground. For the omnidirectional antenna, compared with the antenna adopting the horizontal polarization, the antenna adopting the vertical polarization can realize 360° coverage of a radiation field and improving a roundness of a horizontal radiation pattern of the radiation field, thereby improving the coverage uniformity of the radiation field in the horizontal direction. The roundness of the horizontal radiation pattern is an index for characterizing the uniform coverage effect of the omnidirectional antenna, wherein the "roundness" is related to a deviation of a maximum level or a minimum level from an average level in the horizontal radiation pattern. If the "roundness" is directly reflected into the horizontal radiation pattern, the "roundness" is related to a degree that a pattern formed by all lobes in the horizontal radiation pattern is approximate to a circle.

Figure 15:
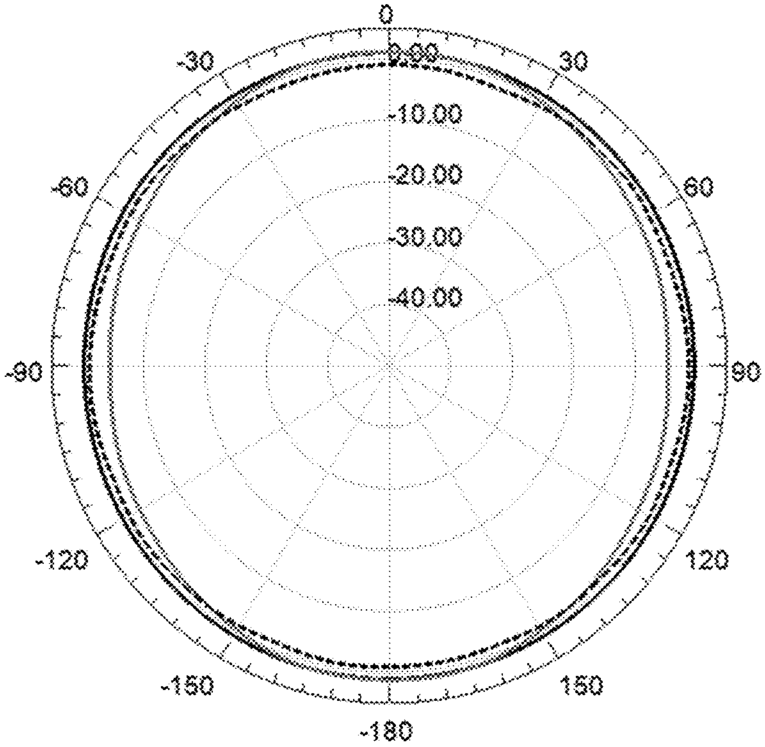
FIG. 15 is a horizontal radiation pattern obtained through a simulation using the antenna of FIG. 3.

FIG. 15 is a horizontal radiation pattern of the antenna in the embodiment shown in FIGS. 3 to 7. Taking the antenna in the embodiment shown in FIGS. 3 to 7 as an example, the antenna is a vertically polarized omnidirectional antenna. It is apparent from FIG. 15 that the horizontal radiation pattern may be regarded as having only one lobe with a lobe width of 360°, that is, the radiation field coverage in the horizontal direction is 360°. For the horizontally polarized antenna, the horizontal radiation pattern (not shown in the figures) generally has at least two lobes, and has a lobe width which cannot reach 360°. The lobe of the vertically polarized antenna is generally approximate to a circle, so that the horizontal radiation pattern has a good roundness, that is, the coverage uniformity of the radiation field in the horizontal direction is good. For the horizontally polarized antenna, uncovered areas inevitably exist between adjacent lobes in the horizontal radiation pattern, so that the coverage uniformity of the radiation field is relatively poor. In addition, since the ground electrode 232 of the antenna does not reflect the electromagnetic wave radiated by the radiation element, the radiation field in the horizontal direction is not adversely affected. It can be seen from FIG. 15 that the coverage of the lobe is large and uniform in the horizontal radiation pattern.

As shown in FIGS. 3 to 8 and FIGS. 10 and 11, in some embodiments, the plane where the substrate 21 is located is perpendicular to the bottom plate 10, and the bottom plate 10 is horizontally mounted on the mounting body, so that the plane where the substrate 21 is located is perpendicular to the ground. Since the first surface and the second surface of the substrate 21 opposite to each other are generally parallel to the plane of the substrate 21, and are also perpendicular to the ground. The radiation element is a radiation patch 22 on a surface (the first surface or the second surface) of the substrate 21; a first terminal of the signal electrode 231 is electrically connected to the radiation patch 22; and a second terminal of the signal electrode 231 extends to a position close to the bottom plate 10 along the first direction, so that the signal electrode 231 is electrically connected to the device including the antenna at the position and a radio frequency current is introduced at the position. The first direction is perpendicular to the bottom plate 10, that is, the first direction is perpendicular to the ground. The radio frequency current is transmitted along the first direction through the signal electrode 231, and finally, fed into the radiation element along the first direction. Based on this, by reasonably designing a shape and a size of the radiation element (for example, the radiation element is disposed to extend substantially along the first direction, and the radiation element is symmetrical with respect to the first direction), it can be realized that the direction of the electric field in the electromagnetic wave finally radiated by the radiation element is perpendicular to the ground, that is, the vertical polarization of the antenna is realized.

It should be noted that a type of the radiation element, the connection between the radiation element and the substrate 21, and the like are not limited. For example, in other embodiments not shown in the drawings, the radiation element is not the radiation patch 22, but a radiation element having a three-dimensional structure, such as a rod-shaped radiation element or cap-shaped radiation element, or the like. In this case, the radiation element may be connected to the first surface or the second surface of the substrate 21, or may be connected to a lateral side of the substrate 21. The method for realizing the vertical polarization for the antenna is not limited to this, and other methods may be used to realize the vertical polarization for the antenna. For example, in other embodiments not shown in the drawings, the radiation element is a radiation element having the three-dimensional structure. In this case, even if the plane where the substrate 21 is located is not perpendicular to the ground, the vertical polarization of the antenna can be finally achieved by reasonably designing the arrangement orientation of the radiation element on the substrate 21 and the structure of the radiation element.

As shown in FIGS. 3 to 8, in some embodiments, the substrate 21 has the first surface and the second surface opposite to each other; the ground electrode 232 includes a first ground electrode 2321 and a second ground electrode 2322; the signal electrode 231, the first ground electrode 2321 and the second ground electrode 2322 are disposed on the first surface; and the first ground electrode 2321 and the second ground electrode 2322 are respectively located on two sides of the signal electrode 231 and are spaced from the signal electrode 231. That is, the signal electrode 231, the first ground electrode 2321 and the second ground electrode 2322 together form a coplanar waveguide (CPW) transmission line, through which a transverse electromagnetic wave (TEM wave) propagates. That is, the TEM wave is an electromagnetic wave which has an electric field component and a magnetic field component perpendicular to each other and both perpendicular to the propagation direction, and has no cut-off frequency. In the coplanar waveguide transmission line, a distance between the first ground electrode 2321 and the signal electrode 231 and a distance between the second ground electrode 2322 and the signal electrode 231 are related to an impedance of a circuit. Therefore, the impedance of the circuit can be changed by changing the distances. For example, the impedance of the circuit can be decreased by decreasing the distance between the first ground electrode 2321 and the signal electrode 231 and the distance between the second ground electrode 2322 and the signal electrode 231. Therefore, by reasonably designing the relative position relationship among the signal electrode 231, the first ground electrode 2321 and the second ground electrode 2322, the impedance matching of the antenna can be realized, thereby reducing a standing-wave ratio and further improving the performance of the antenna.

Further, as shown in FIG. 3 to FIG. 8, in some embodiments, the radiation element is the radiation patch 22 on the first surface. That is, the radiation patch 22, the signal electrode 231, the first ground electrode 2321 and the second ground electrode 2322 are all disposed on a same surface of the substrate 21, which is more convenient for manufacturing. The first terminal of the signal electrode 231 is electrically connected to the radiation patch 22, and the second terminal of the signal electrode 231 extends to a position close to the bottom plate 10 along the first direction. That is, the signal electrode 231 is straight, one terminal of the signal electrode 231 is electrically connected to the radiation patch 22, and the other terminal of the signal electrode 231 extends to the position close to the bottom plate 10, so as to achieve the electrical connection between the signal electrode 231 and the device including the antenna at the position. The radiation patch 22 and the ground electrode 232 are spaced from each other in the first direction. An extension line of the first direction intersects with the bottom plate 10, but a specific angular relationship between the first direction and the bottom plate 10 is not limited. Preferably, the first direction is perpendicular to the bottom plate 10.

Alternatively, it is understood that the positional relationship among the radiation patch 22, the signal electrode 231, and the ground electrode 232 is not limited thereto. In other embodiments not shown in the drawings, the radiation patch 22 and the signal electrode 231 may not be disposed on a same surface of the substrate 21. For example, the signal electrode 231 is disposed on the first surface, and the radiation patch 22 is disposed on the second surface. In this case, it is necessary to provide holes in the substrate 21 through which the electrical connection between the signal electrode 231 and the radiation patch 22 is realized by means of filling metal or the like. In this way, a relatively complicated manufacturing process may be caused and the cost may be increased, but it belongs to a way which can be achieved. In addition, in other embodiments not shown in the drawings, the signal electrode 231 may not be provided to be straight. For example, the signal electrode 231 has at least one bent segment. In this case, by reasonably designing the relative position relationship among the radiation patch 22, the ground electrode 232 and the signal electrode 231, the electrical connection between the signal electrode 231 and the radiation patch 22 can be ensured, and the parameters of the antenna, such as the impedance of the antenna, etc., can meet the requirements.

It should be noted that the performance of the antenna, such as a frequency range, the coverage, and the coverage uniformity, or the like, is mainly related to the parameters, such as the shape and the size of the radiation patch 22, and a distance between the radiation patch 22 and the ground electrode 232, or the like. Therefore, these parameters need to be further reasonably designed.

Figure 5:
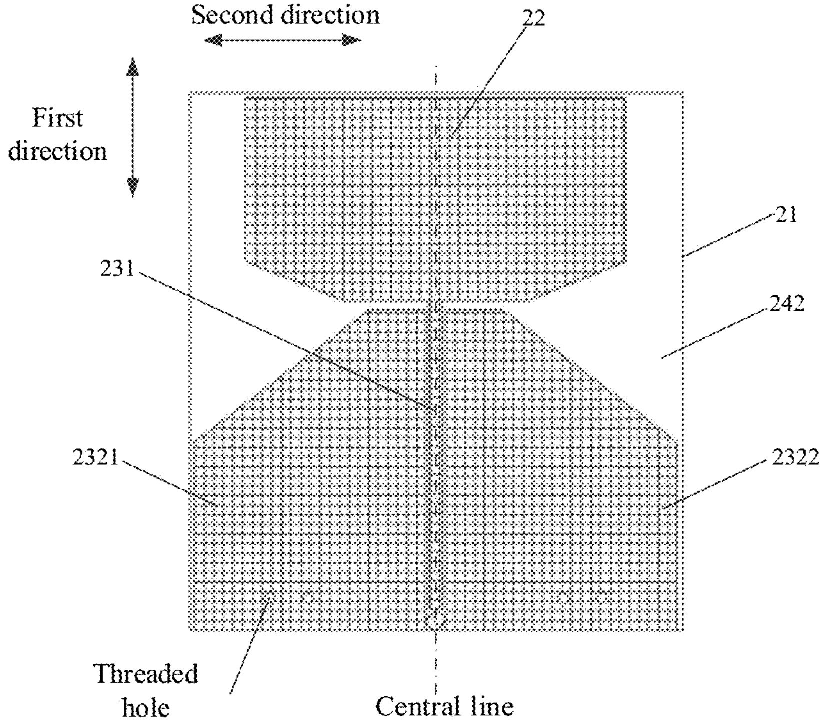
FIGS. 5 to 7 are schematic diagrams of a structure of an antenna body of the antenna of FIG. 3, wherein FIG. 5 mainly shows a positional relationship among components in the antenna body, and FIGS. 6 and 7 mainly show a positional relationship among edges of a radiation patch and a ground electrode, and sizes of the edges of the radiation patch and the ground electrode.
Figure 6:
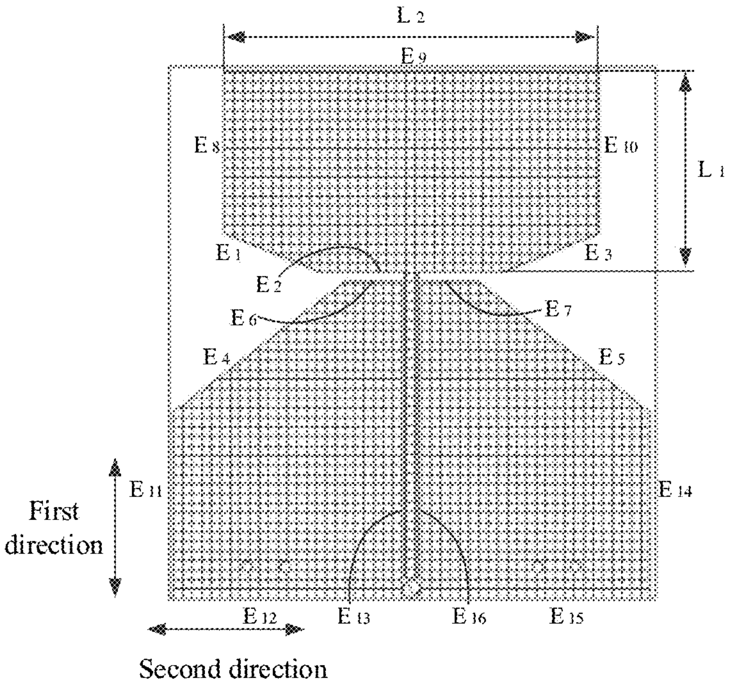
Figure 7:
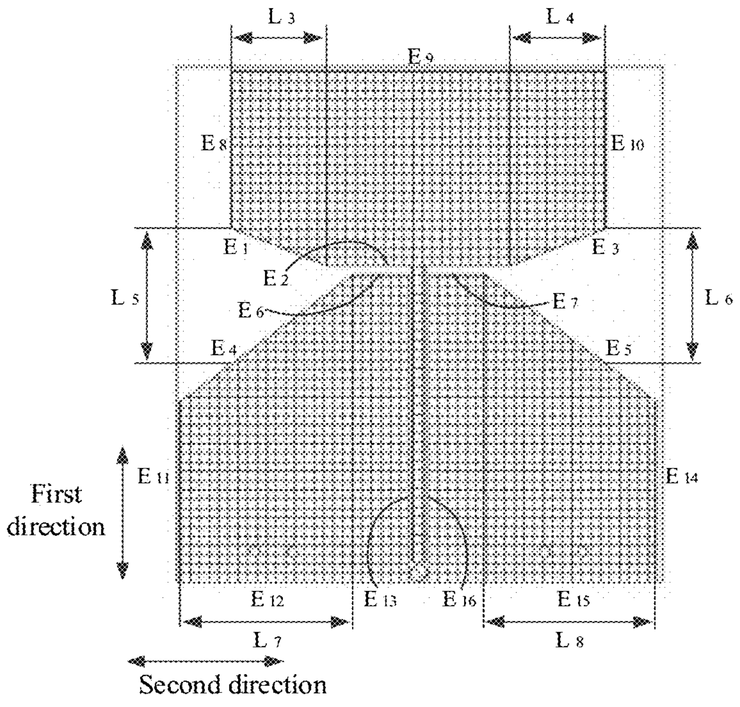
Figure 8:
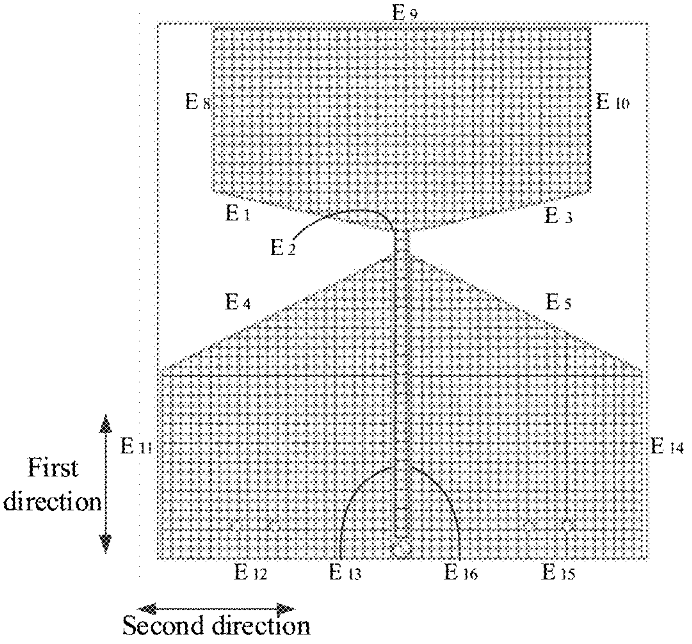
FIG. 8 is a schematic diagram of a structure of an antenna body of another antenna according to the embodiment of the present disclosure, where a radiation patch and a ground electrode of the antenna body have structures different from those of the antenna body in the above embodiments.
Figure 9:
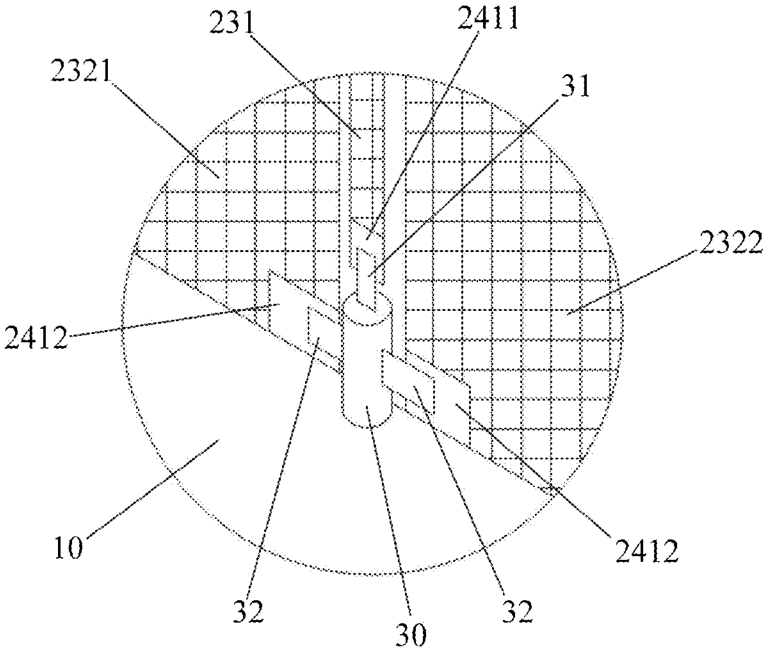
FIG. 9 is an enlarged view of a point A in FIG. 4.

As shown in FIGS. 5 to 7, in some embodiments, the radiation patch 22 has a first edge E1, a second edge E2, and a third edge E3 on a side of the radiation patch 22 close to the ground electrode 232 and connected in sequence, and the signal electrode 231 is electrically connected to the second edge E2. The first ground electrode 2321 has a fourth edge E4 facing toward (close to) the first edge E1 in the first direction, and the second ground electrode 2322 has a fifth edge E5 disposed toward the third edge E3 in the first direction. In a second direction perpendicular to the first direction, a distance L5 between the first edge E1 and the fourth edge E4 gradually increases along a direction away from the signal electrode 231 (in a direction indicated by a left arrow of the "second direction" shown in FIG. 7), and a distance L6 between the third edge E3 and the fifth edge E5 gradually increases along a direction away from the signal electrode 231 (in a direction indicated by a right arrow of the "second direction" shown in FIG. 7). When the first direction is perpendicular to the bottom plate 10 and the bottom plate 10 is horizontally mounted on the mounting body, the second direction is the horizontal direction.

The above structural design can ensure the transmission performance of the coplanar waveguide transmission line, and ensure a distance between the radiation patch 22 and the first ground electrode 2321, and a distance between the radiation patch 22 and the second ground electrode 2322. A variation tendency of the distance between the radiation patch 22 and the first ground electrode 2321 (i.e., the distance L5 between the first edge E1 and the fourth edge E4) is gradually increased along the direction away from the signal electrode 231 (i.e., the direction indicated by the left arrow in the second direction), and a variation tendency of the distance between the radiation patch 22 and the second ground electrode 2322 (i.e., the distance L6 between the third edge E3 and the fifth edge E5) is gradually increased along the direction away from the signal electrode 231 (i.e., the direction indicated by the right arrow in the second direction), which can widen a bandwidth of an input impedance, thereby improving an overall operating bandwidth of the antenna.

Alternatively, it is understood that in other embodiments not shown in the drawings, the first edge E1 of the radiation patch 22 and the fourth edge E4 of the first ground electrode 2321 may be parallel to each other, so that the distance L5 between the first edge E1 and the fourth edge E4 is kept constant in the second direction; and/or, the third edge E3 of the radiation patch 22 and the fifth edge E5 of the second ground electrode 2322 may be parallel to each other, so that the distance L6 between the third edge E3 and the fifth edge E5 is kept constant in the second direction.

It should be noted that the arrangement between the first edge E1 and the fourth edge E4 and/or between the third edge E3 and the fifth edge E5 is not limited. For example, as shown in FIGS. 5 to 7, in some embodiments, the first edge E1 and the fourth edge E4 are both disposed obliquely in opposite directions with respect to the second direction. In this case, each of the first edge E1 and the fourth edge E4 is disposed at an angle with respect to the second direction. In addition, the third edge E3 and the fifth edge E5 are both disposed obliquely in opposite directions with respect to the second direction. In this case, each of the third edge E3 and the fifth edge E5 is disposed at an angle with respect to the second direction. The radiation patch 22, the first ground electrode 2321 and the second ground electrode 2322 adopt the above structure, so that the first edge E1, the third edge E3, the fourth edge E4 and the fifth edge E5 may be disposed obliquely with respect to the second direction. By reasonably designing the angle between each edge and the second direction, the distance L5 and the distance L6 can be adjusted more flexibly, and have a greater adjustable range.

Alternatively, it is understood that in other embodiments not shown in the drawings, one of the first edge E1 and the fourth edge E4 is parallel to the second direction, and the other of the first edge E1 and the fourth edge E4 is disposed obliquely with respect to the second direction, so that the distance L5 between the first edge E1 and the fourth edge E4 can be gradually increased along the direction away from the signal electrode 231; and/or one of the third edge E3 and the fifth edge E5 is parallel to the second direction, and the other of the third edge E3 and the fifth edge E5 is disposed obliquely with respect to the second direction, so that the distance L6 between the third edge E3 and the fifth edge E5 can be increased gradually along the direction away from the signal electrode 231. However, in this way, an adjustment of the corresponding distance can be realized only by designing an angle between one of each pair of edges and the second direction, so that the adjustment flexibility and the adjustable range are relatively small.

In particular, as shown in FIGS. 5 to 7, in some embodiments, the first ground electrode 2321 also has a sixth edge E6 disposed toward the second edge E2 in the first direction, the sixth edge E6 is parallel to the second edge E2. The sixth edge E6 is directly connected to the fourth edge E4. In addition, the second ground electrode 2322 also has a seventh edge E7 disposed toward the second edge E2 in the first direction, the seventh edge E7 is parallel to the second edge E2. The seventh edge E7 is directly connected to the fifth edge E5. Preferably, a distance between the sixth edge E6 and the second edge E2 is equal to a distance between the seventh edge E7 and the second edge E2.

In the particular embodiment shown in FIGS. 5 to 7, the radiation patch 22 also has an eighth edge E8, a ninth edge E9, and a tenth edge E10 connected in sequence. A terminal of the eighth edge E8 away from the ninth edge E9 is directly connected to the first edge E1, and a terminal of the tenth edge E10 away from the ninth edge E9 is directly connected to the third edge E3. The eighth edge E8 is parallel to the tenth edge E10, and the ninth edge E9 is parallel to the second edge E2.

The first ground electrode 2321 further has an eleventh edge E11, a twelfth edge E12 and a thirteenth edge E13 connected in sequence. A terminal of the eleventh edge E11 away from the twelfth edge E12 is directly connected to the fourth edge E4, and a terminal of the thirteenth edge E13 away from the twelfth edge E12 is directly connected to the sixth edge E6. The eleventh edge E11 is parallel to the thirteenth edge E13 and the sixth edge E6 is parallel to the twelfth edge E12.

The second ground electrode 2322 further has a fourteenth edge E14, a fifteenth edge E15 and a sixteenth edge E16 connected in sequence. A terminal of the fourteenth edge E14 away from the fifteenth edge E15 is directly connected to the fifth edge E5, and a terminal of the sixteenth edge E16 away from the fifteenth edge E15 is directly connected to the seventh edge E7. The fourteenth edge E14 is parallel to the sixteenth edge E16, and the seventh edge E7 is parallel to the fifteenth edge E15.

The edges of the radiation patch 22, the first ground electrode 2321 and the second ground electrode 2322 are straight, and the relationship among the edges is defined as above, so that approximate shapes (shapes shown in FIGS. 5 to 7) of the radiation patch 22, the first ground electrode 2321 and the second ground electrode 2322 may be obtained. Alternatively, it is understood that the shapes of the radiation patch 22, the first ground electrode 2321 and the second ground electrode 2322 are not limited thereto. In other embodiments not shown in the drawings, the shape of each of the radiation patch 22, the first ground electrode 2321 and the second ground electrode 2322 may be designed as any shape according to practical situations, to provide a desired radiation field. For example, in the particular embodiment illustrated in FIG. 8, the first ground electrode 2321 does not include the sixth edge E6, the second ground electrode 2322 does not include the seventh edge E7, the fourth edge E4 of the first ground electrode 2321 is directly connected to the thirteenth edge E13, and the fifth edge E5 of the second ground electrode 2322 is directly connected to the sixteenth edge E16. In addition, in other embodiments not shown in the figures, at least one edge of the radiation patch 22, the first ground electrode 2321 and the second ground electrode 2322 may also be in a shape of an arc, an irregular curve, or the like.

Further, as shown in FIGS. 3 to 8, in some embodiments, the radiation patch 22 is divided into two parts by an extension line of a central line of the signal electrode 231, and the two parts are of bilateral symmetry with respect to the signal electrode 231 (i.e., the first direction). The first ground electrode 2321 and the second ground electrode 2322 are of bilateral symmetry with respect to the signal electrode 231. The symmetrical arrangement is more beneficial to the coverage uniformity of the radiation field and is convenient for processing and manufacturing. Alternatively, it is understood that in other embodiments not shown in the drawings, the radiation patch 22 may be disposed in an asymmetric structure, and/or the first ground electrode 2321 and the second ground electrode 2322 may be disposed in an asymmetric way.

Except that the shape of the radiation patch 22 adversely affects the performance of the antenna, parameters such as the size of the radiation patch 22, the distance between the radiation patch 22 and the ground electrode 232 also adversely affect the performance of the antenna. Therefore, it is necessary to further define the size of the radiation patch 22 and the distance between the radiation patch 22 and the ground electrode 232.

In some embodiments, a wavelength corresponding to a center frequency of an operating frequency band of the antenna (i.e., a frequency band ultimately required by the antenna) is a reference wavelength λc. A size L3 of the first edge E1 in the second direction is 0.14 to 0.16 times of the reference wavelength λc, and/or a size L4 of the third edge E3 in the second direction is 0.14 to 0.16 times of the reference wavelength λc, and/or a size L7 of the fourth edge E4 in the second direction is 0.25 to 0.27 times of the reference wavelength, and/or a size L8 of the fifth edge E5 in the second direction is 0.25 to 0.27 times of the reference wavelength. In addition, minimum and maximum values of the distance L5 between the first edge E1 and the fourth edge E4 and the distance L6 between the third edge E3 and the fifth edge E5 are also defined. Specifically, a minimum distance (i.e., a minimum value of the distance L5) between the first edge E1 and the fourth edge E4 is 0.014 to 0.015 times of the reference wavelength λc, and/or a minimum distance (i.e., a minimum value of the distance L6) between the third edge E3 and the fifth edge E5 is 0.014 to 0.015 times of the reference wavelength λc, and/or a maximum distance (i.e., a maximum value of the distance L5) between the first edge E1 and the fourth edge E4 is 0.27 to 0.3 times of the reference wavelength λc, and/or a maximum distance (i.e., a maximum value of the distance L6) between the third edge E3 and the fifth edge E5 is 0.27 to 0.3 times of the reference wavelength λc.

In fact, when each of the first edge E1 and the fourth edge E4 is disposed at an angle with respect to the second direction, if the size L3 of the first edge E1 in the second direction, the size L7 of the fourth edge E4 in the second direction, and the distance L5 between the first edge E1 and the fourth edge E4 are determined, the angle between the first edge E1 and the second direction and the angle between the fourth edge E4 and the second direction may be substantially determined; when each of the third edge E3 and the fifth edge E5 is disposed at an angle with respect to the second direction, if the size L4 of the third edge E3 in the second direction, the size L8 of the fifth edge E5 in the second direction, and the distance L6 between the third edge E3 and the fifth edge E5 are determined, the angle between the third edge E3 and the second direction and the angle between the fifth edge E5 and the second direction may be substantially determined.

Additionally, in some embodiments, it is necessary to further define the sizes of the radiation patch 22 in the first direction and/or the second direction. Specifically, a size L1 of the radiation patch 22 in the first direction is 0.41 to 0.45 times of the reference wavelength λc, and/or a size L2 of the radiation patch 22 in the second direction perpendicular to the first direction is 0.55 to 0.6 times of the reference wavelength λc. As shown in FIGS. 3 to 7, when the eighth edge E8 of the radiation patch 22 is parallel to the tenth edge E10 and the ninth edge E9 of the radiation patch 22 is parallel to the second edge E2, the size L1 is a distance between the ninth edge E9 and the second edge E2, and the size L2 is a distance between the eighth edge E8 and the tenth edge E10.

In the specific embodiment shown in FIGS. 3 to 7, the antenna is a vertically polarized omnidirectional antenna, the substrate 21 is rectangular, and has two long sides disposed oppositely to each other and two short sides connected between the two long sides, wherein the long sides are parallel to the first direction, and the short sides are parallel to the second direction. The ninth edge E9, the second edge E2, the sixth edge E6, the twelfth edge E12, and the fifteenth edge E15 are all parallel to the short sides, and the eighth edge E8, the tenth edge E10, the eleventh edge E11, and the fourteenth edge E14 are all parallel to the long sides. The ninth edge E9 is disposed closely to one short side, and the twelfth edge E12 and the fifteenth edge E15 are disposed closely to the other short side. The eleventh edge E11 and the fourteenth edge E14 are disposed closely to the two long sides, respectively. There is a distance between the eighth edge E8 and one long side close to the eighth edge E8, and there is a same distance between the tenth edge E10 and the other long side close to the tenth edge E10.

Figure 14:
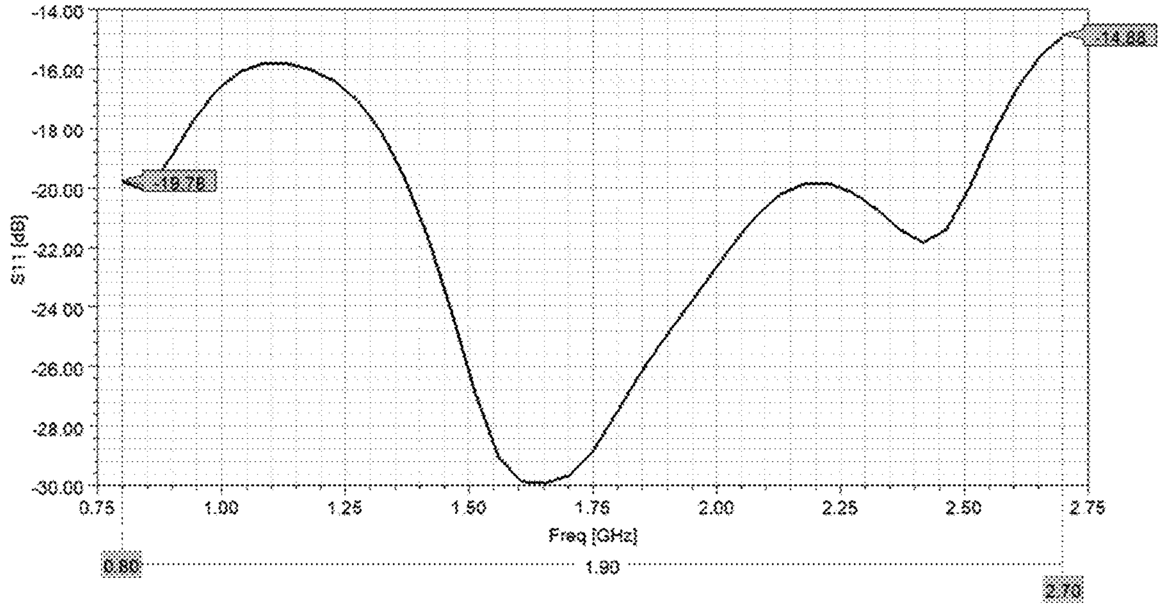
FIG. 14 is a schematic diagram of a S11 characteristic (i.e., a return loss characteristic) obtained through a simulation using the antenna of FIG. 3.

In the above specific embodiment, the operating frequency band of the antenna is in a range of 800 MHz to 2700 MHz; the size L1 of the radiation patch 22 in the first direction is approximately 76 mm; the size L2 of the radiation patch 22 in the second direction is approximately 100 mm; each of the size L3 of the first edge E1 in the second direction and the size L4 of the third edge E3 in the second direction is approximately 26 mm; each of the maximum value of the distance L5 between the first edge E1 and the fourth edge E4 and the maximum value of the distance L6 between the third edge E3 and the fifth edge E5 is approximately 48 mm; each of the minimum value of the distance L5 between the first edge E1 and the fourth edge E4 and the minimum value of the distance L6 between the third edge E3 and the fifth edge E5 is approximately 5 mm; each of the size L7 of the fourth edge E4 in the second direction and the size L5 of the fifth edge E5 in the second direction is approximately 46 mm; and each of the distance between the second edge E2 and the sixth edge E6 and the distance between the second edge E2 and the seventh edge E7 is approximately 2.5 mm. FIGS. 14 and 15 are obtained by the inventors through simulation for the antenna. FIG. 14 is a schematic diagram of a S11 characteristic (i.e., a return loss characteristic) of the antenna, and FIG. 15 is a horizontal radiation pattern of the antenna. It can be seen from FIG. 14 that return loss values of the antenna in a frequency band in a range of 0.8 GHz to 2.7 GHz (i.e., in a range of 800 MHz to 2700 MHZ) are all less than −14 dB and thus, within an allowable range, so that the antenna can cover the frequency band in a range of 800 MHz to 2700 MHz, i.e. all frequency bands of 2G/3G/4G/5G. In addition, it can be seen from FIG. 15 that the radiation field coverage of the antenna in the horizontal direction is 360°, and the horizontal radiation pattern has a better roundness and a more uniform coverage.

In some embodiments, the antenna is an omnidirectional antenna mounted in an indoor environment for covering indoor signals. Therefore, the antenna is an important component of an indoor distribution system. With the advent of the 5G era, user demands for aesthetic appearance and concealment of indoor antennas have been increasing. Therefore, it has become a trend that indoor antennas have excellent light transmission characteristics to exhibit a transparent effect.

Specifically, the substrate 21 is transparent. The substrate 21 is mainly used for supporting the radiation patch 22, the feeding structure 23, and the like, so that the substrate 21 is generally made of a transparent hard material, such as an organic polymer material (such as polymethyl methacrylate (PMMA), which is also called acrylic or organic glass). Further, as shown in FIGS. 3 to 8, 10, 11 and 12, the antenna body 20 further includes a transparent conductive film 24, and the transparent conductive film 24 includes a metal conductive layer 241, a transparent substrate layer 242 and a transparent adhesive layer 243 which are sequentially stacked. The transparent adhesive layer 243 is used for adhering with the first surface and/or the second surface of the substrate 21. The metal conductive layer 241 is etched to form the radiation patch 22, the signal electrode 231, and the ground electrode 232 in a mesh, so that the radiation patch 22, the signal electrode 231, and the ground electrode 232 are all transparent, thereby rendering the whole antenna body 20 to have the transparent effect.

The transparent substrate layer 242 may be regarded as a transparent flexible film as a substrate for supporting the metal conductive layer 241, and be usually made of a transparent flexible material, such as polyethylene terephthalate (PET), copolymers of cycloolefin (COP), polyimide (PI), etc. The metal conductive layer 241 may be deposited on the transparent substrate layer 242 through a physical vapor deposition process, a chemical vapor deposition process or the like. The metal conductive layer 241 is necessarily made of a metal material having a good conductive property, such as copper, silver, or the like. The solid metal conductive layer 241 may be cut through an etching process to form numerous hollowed holes, thereby forming a mesh, so that the metal conductive layer 241 has excellent light transmission characteristics, and the transparent conductive film 24 with a transparent effect is obtained. In the etching process, the radiation patch 22, the signal electrode 231 and the ground electrode 232 may be formed by directly etching according to the designed parameters, such as the shape, size and arrangement orientation of each of the radiation patch 22, the signal electrode 231 and the ground electrode 232 (for example, the first ground electrode 2321 and the second ground electrode 2322), so that the radiation patch 22, the signal electrode 231 and the ground electrode 232 finally exhibit the transparent effect. The transparent adhesive layer 243 may be a transparent adhesive, such as an optical clear adhesive (OCA) optical adhesive, which is a special substrate-free double-sided adhesive having an optical transparency. The transparent conductive film 24 may be finally attached to the substrate 21 through the adhesion between the transparent adhesive layer 243 and the first surface and/or the second surface of the substrate 21. It can be seen that the radiation patch 22, the signal electrode 231, and the ground electrode 232 can be made transparent by providing the transparent conductive film 24, and the substrate 21 is also made transparent, so that the whole antenna body 20 has a transparent effect, and further, the aesthetic appearance and concealment can be improved, and the processing and manufacturing are convenient.

Figure 13:
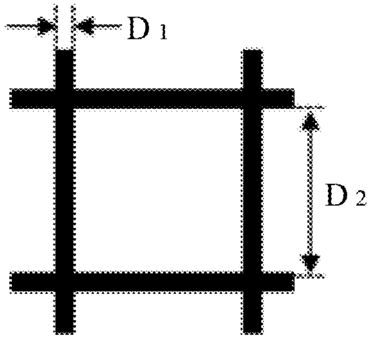
FIG. 13 is a schematic diagram of a structure of a single mesh formed by etching a metal conductive layer of a transparent conductive film of FIG. 12.

In order to simultaneously achieve both the light transmittance of the transparent conductive film 24 and the electrical conductivity and mechanical strength of each structure formed by the metal conductive layer 241, it is necessary to further define a thickness of the metal conductive layer 241 and parameters of the mesh thereon. Specifically, as shown in FIG. 13, in some embodiments, each of the holes formed by etching the metal conductive layer 241 is rectangular, for example, square; a line width D1 of the mesh formed by the metal conductive layer 241 is in a range of 2 um to 30 um; a line spacing D2 of the mesh formed by the metal conductive layer 241 is in a range of 50 um to 200 um; the thickness of the metal conductive layer 241 is in a range of 1 um to 10 um; the finally formed transparent conductive film 24 has the light transmittance in a range of 70% to 88%; and a thickness of the transparent conductive film 24 is in a range of 25 um to 100 um.

It should be noted that in the specific embodiment shown in FIG. 3 to FIG. 7, the radiation patch 22, the signal electrode 231 and the ground electrode 232 (the first ground electrode 2321 and the second ground electrode 2322) are located on the first surface of the substrate 21. In this case, the transparent substrate layer 242 completely covering the first surface and the metal conductive layer 241 completely covering the transparent substrate layer 242 may be disposed; and the radiation patch 22, the signal electrode 231 and the ground electrode 232 may be directly formed on the metal conductive layer 241 by etching, so that the processing and manufacturing is simpler and the cost is saved. Alternatively, it is understood that in other embodiments, the radiation patch 22, the signal electrode 231, or the ground electrode 232 may be formed by etching a plurality of metal conductive layers 241, respectively.

As shown in FIGS. 3 to 9, in some embodiments, the antenna further includes a signal transmission structure 30, which penetrates from a side of the bottom plate 10 close to the mounting body to a side of the bottom plate 10 where the antenna body 20 is disposed. The signal transmission structure 30 includes a first conductive portion 31 and a second conductive portion 32 insulated from each other. The signal transmission structure 30 is configured to be electrically connected to the feed-forward circuit of the device including the antenna. The specific type of the signal transmission structure 30 is not limited, and may be any structure capable of achieving the signal transmission, such as a coaxial cable, a flexible circuit board, or the like. When the signal transmission structure 30 is a coaxial cable, an inner conductor of the coaxial cable forms the first conductive portion 31, and an outer conductor forms the second conductive portion 32. Alternatively, a first conductive sheet extending out is connected to the inner conductor of the coaxial cable, and two second conductive sheets extending out are connected to the outer conductor of the coaxial cable; the first conductive sheet forms the first conductive portion 31, and the second conductive sheets form the second conductive portion 32.

Further, when the metal conductive layer 241 is etched, a first solid metal portion 2411 and a second solid metal portion 2412 are formed by remaining, and are electrically connected to the signal electrode 231 and the ground electrode 232, respectively. The first conductive portion 31 electrically cooperates with the first solid metal portion 2411 to enable the signal electrode 231 to transmit radio frequency signals, and the second conductive portion 32 electrically cooperates with the second solid metal portion 2412 to enable the ground electrode 232 to be grounded. The first solid metal portion 2411 and the second solid metal portion 2412 are formed by remaining when the metal conductive layer 241 is etched, and no additional conductive structure is needed, thereby saving process steps and cost. It is noted that the electrical connection between the first conductive portion 31 and the first solid metal portion 2411, and the electrical connection between the second conductive portion 32 and the second solid metal portion 2412 are not limited. The electrical connection between the two portions to be electrically connected to each other may be achieved while achieving a mechanical connection therebetween by means of soldering or the like. Alternatively, the electrical connection between the two portions to be electrically connected to each other may be achieved at a position only in a way of conductive contact, a capacitive coupling feed, or the like, without the mechanical connection therebetween at this position.

Figure 10:
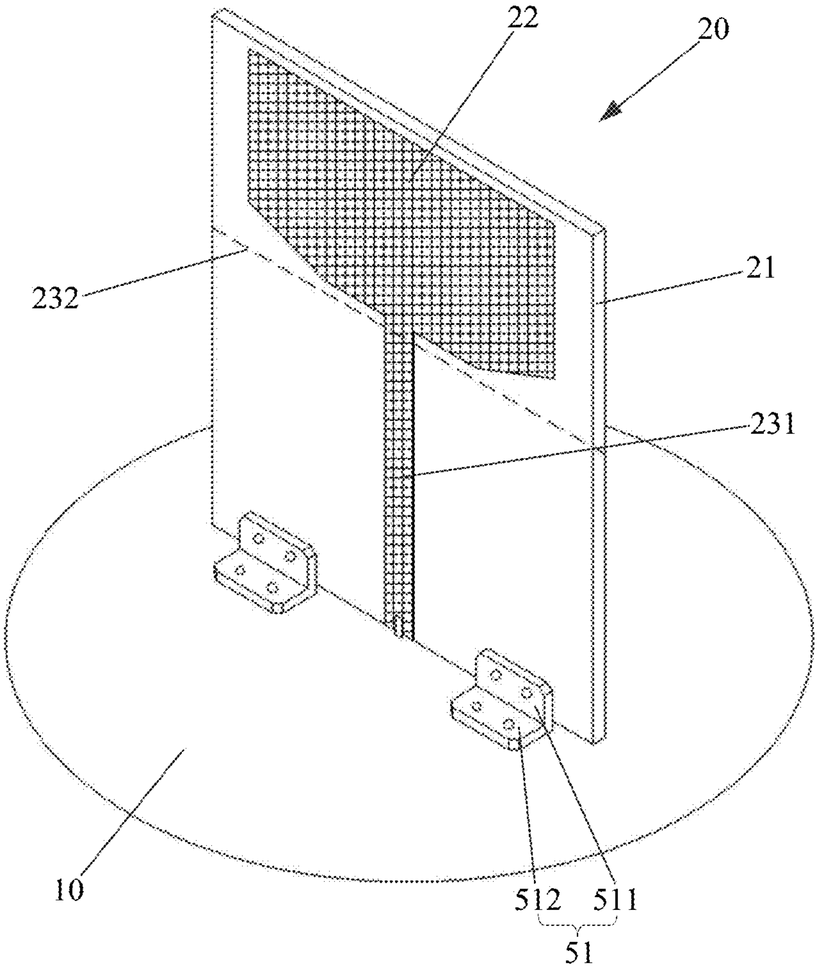
FIG. 10 is a schematic diagram of a structure of an antenna according to another embodiment of the present disclosure.
Figure 11:
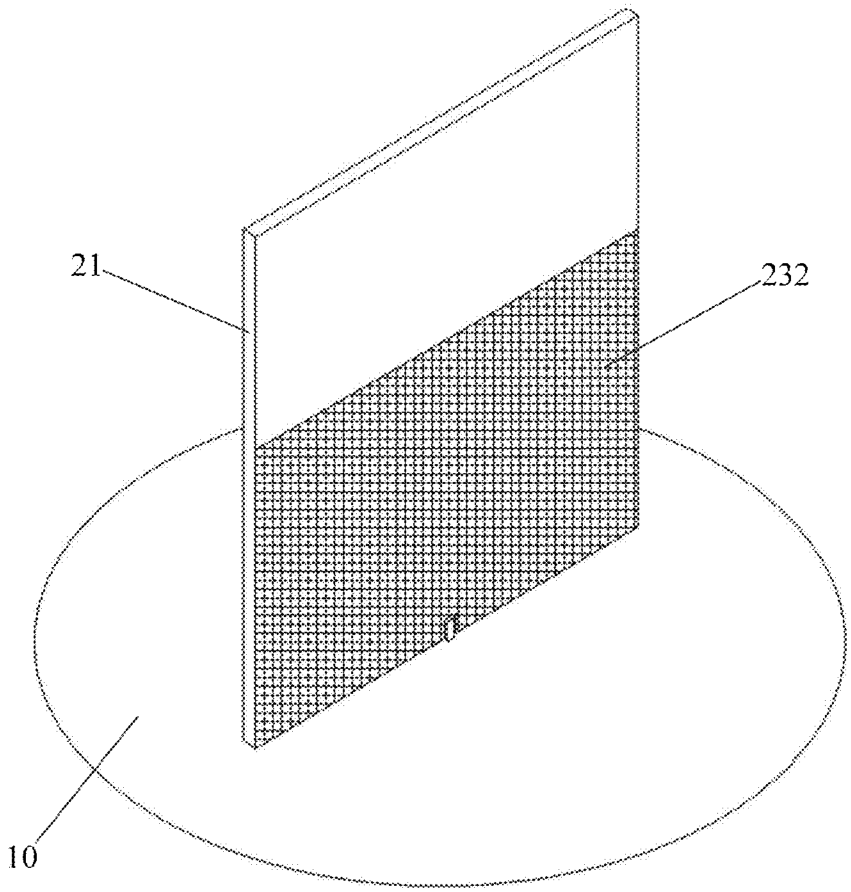
FIG. 11 is a schematic diagram of a structure of the antenna of FIG. 10 from another perspective.
Figure 12:
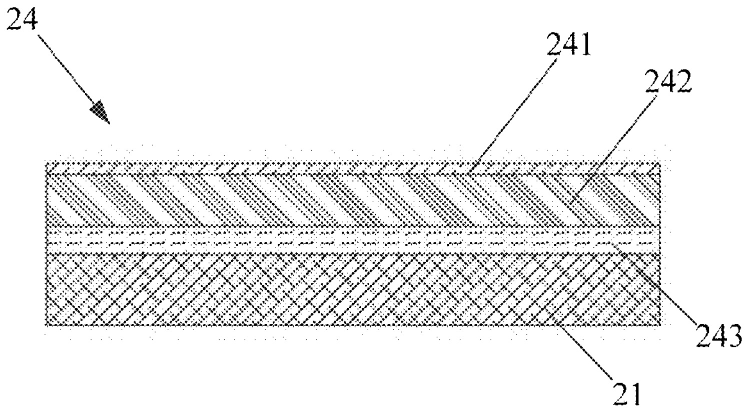
FIG. 12 is a schematic cross-sectional view of a transparent conductive film of an antenna according to an embodiment of the present disclosure.

The embodiment has been descripted in detail above in which the signal electrode 231, the first ground electrode 2321 and the second ground electrode 2322 together form the coplanar waveguide transmission line. However, it is understood that the arrangement of the signal electrode 231 and the ground electrode 232 is not limited thereto. As shown in FIGS. 10 and 11, in other embodiments, the substrate 21 has the first surface and the second surface opposite to each other; the signal electrode 231 is arranged on the first surface; the ground electrode 232 is arranged on the second surface; and the signal electrode 231 and the ground electrode 232 at least partially correspond to each other in a thickness direction of the substrate 21. The structure and the arrangement position of the radiation element are not limited. The signal electrode 231 and the ground electrode 232 together form a microstrip transmission line, which can also achieve the functions of transmitting radio frequency signals and grounding.

When the radiation element is the radiation patch 22, the radiation patch 22 is typically disposed on the first surface, but may be disposed on the second surface. Accordingly, the radiation patch 22, the signal electrode 231, and the ground electrode 232 may be formed in such a manner that the transparent conductive film 24 is provided as described above. However, during manufacturing, it is necessary to provide the transparent substrate layer 242 and the metal conductive layer 241 on both the first surface and the second surface of the substrate 21, and it is necessary to etch the metal conductive layers 241 on both the first surface and the second surface, respectively, to form the corresponding radiation patch 22, the signal electrode 231, or the ground electrode 232. Thus, the process is relatively more complex and costly, but still a way to do so.

Figure 3:
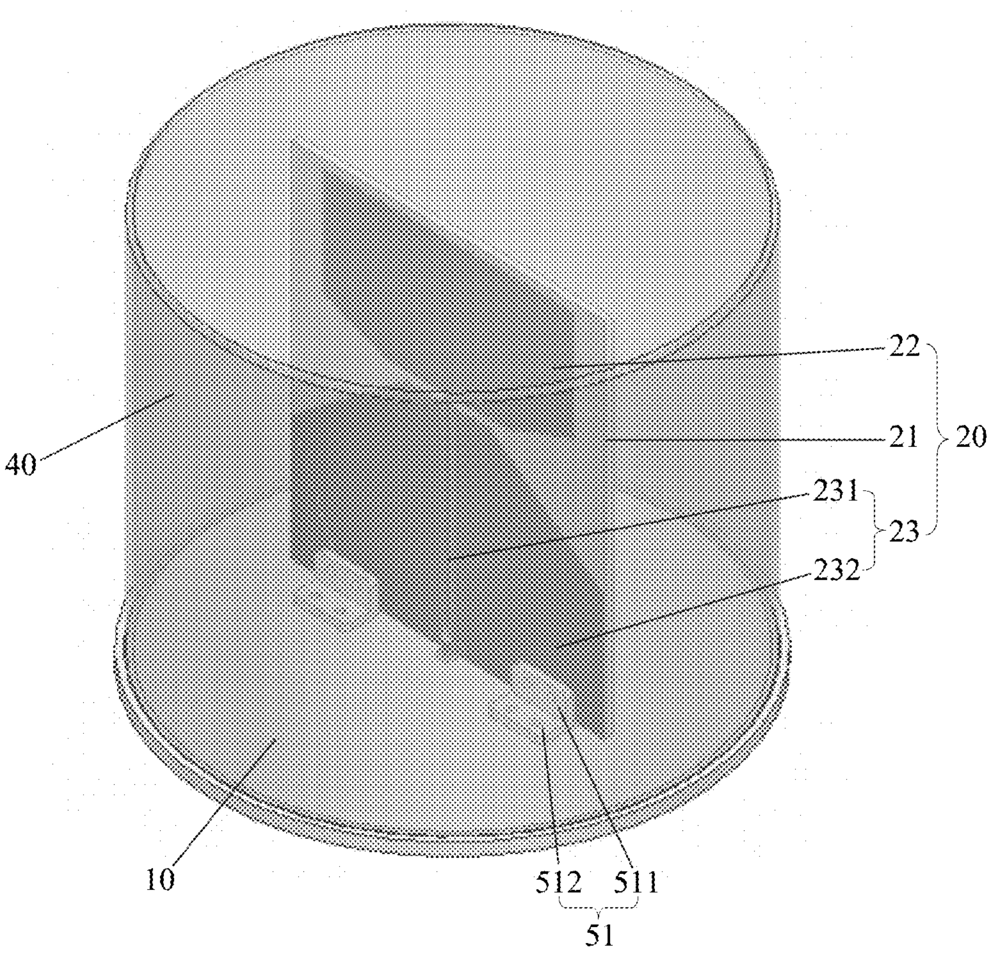
FIG. 3 is a schematic diagram of a structure of an antenna according to an embodiment of the present disclosure.
Figure 4:
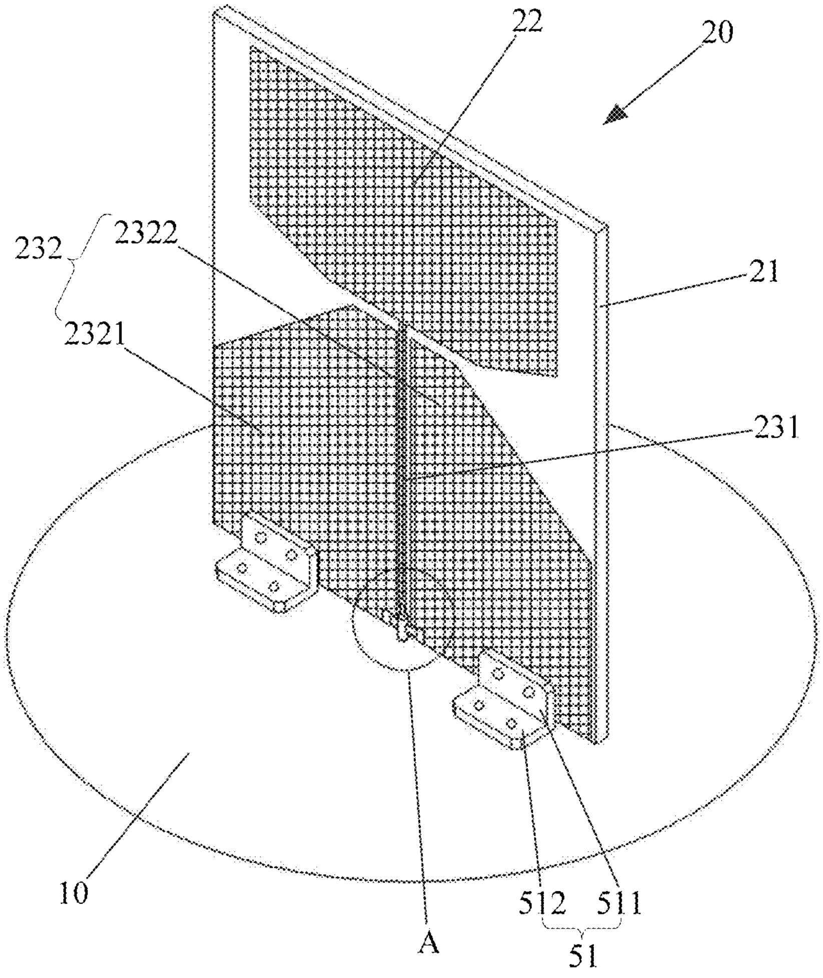
FIG. 4 is a schematic diagram of a structure of an antenna body, a bottom plate and a fixing structure of the antenna of FIG. 3.

As shown in FIGS. 3, 4 and 10, in some embodiments, the antenna further includes an outer cover 40 and a fixing structure; the outer cover 40 is covered above the bottom plate 10 and is covered on the outside of the antenna body 20; and the fixing structure is used for connecting the antenna body 20 and the bottom plate 10, and/or for connecting the outer cover 40 and the bottom plate 10, and/or for connecting the bottom plate 10 and the mounting body. The bottom plate 10, the outer cover 40 and the fixing structure are all transparent, so that the antenna can present a better transparent effect as a whole, thereby improving the aesthetic appearance and concealment. The transparent material used for the bottom plate 10, the outer cover 40 and the fixing structure may be the same as that used for the substrate 21. For example, the transparent material is an organic polymer material such as polymethyl methacrylate (PMMA), that is, acrylic (or organic glass).

In addition, it should be noted that a gap is required to be existed between the outer cover 40 and the antenna body 20, that is, the outer cover 40 and the antenna body 20 are not in contact with each other. A distance between the outer cover 40 and the antenna body 20 also adversely affects the performance, such as the distribution of the radiation field, to a certain extent. For example, in some embodiments, a width (i.e., a size of the short side of the substrate 21) of the antenna body 20 is 0.65 to 0.75 times of the reference wavelength λc, a height (i.e., a size of the long side of the substrate 21) of the antenna body 20 is 0.9 to 1 times of the reference wavelength λc, a diameter of the entire antenna (i.e., a diameter of the outer cover 40) is 1.1 to 1.2 times of the reference wavelength λc, and a height (which is approximately equal to a height of the outer cover 40) of the entire antenna is 1 to 1.2 times of the reference wavelength λc. In the particular embodiment shown in FIG. 3, the width (i.e., the size of the short side of the substrate 21) of the antenna body 20 is approximately 125 mm, the height (i.e., the size of the long side of the substrate 21) of the antenna body 20 is approximately 165 mm, the diameter (i.e., the diameter of the outer cover 40) of the entire antenna is approximately 198 mm, and the height (which is approximately equal to the height of the outer cover 40) of the entire antenna is approximately 177 mm.

The specific type, the specific structure and the specific application of the fixing structure are not limited, and the fixing structure may be used to connect the antenna body 20 and the bottom plate 10, to connect the outer cover 40 and the bottom plate 10, and to connect the bottom plate 10 and the mounting body. Taking the fixing structure for connecting the antenna body 20 and the bottom plate 10 as an example, as shown in FIG. 3, FIG. 4 and FIG. 10, in some embodiments, the fixing structure includes an antenna body positioning element 51 and a fastener, the antenna body positioning element 51 includes a first connection portion 511 and a second connection portion 512 with an angle therebetween; the first connection portion 511 is connected to the first surface and/or the second surface of the substrate 21 through the fastener (not shown in the figures), and the second connection portion 512 is connected to the bottom plate 10 through the fastener, thereby achieving a simple structure and a reliable connection.

In general, the angle between the first connection portion 511 and the second connection portion 512 is determined according to an angle between the plane where the substrate 21 is located and the bottom plate 10. For example, when the plane where the substrate 21 is located is perpendicular to the bottom plate 10, the first connection portion 511 and the second connection portion 512 are also perpendicular to each other, and a longitudinal section of the antenna body positioning element 51 is substantially "L-shaped", so that the first connection portion 511 can be attached to the surface of the substrate 21, and the second connection portion 512 can be attached to the bottom plate 10, thereby improving the accuracy of positioning the substrate 21. In addition, the specific type of the fastener is not limited, and the fastener may be a fastening structure such as a bolt, a screw, a buckle, or the like. It should be noted that the antenna body positioning element 51 and the fastener need to be made of transparent materials. Alternatively, it is understood that the specific structure of the antenna body positioning element 51 is not limited thereto. In other embodiments not shown in the drawings, other structures, such as a positioning block having a neck or the like, capable of achieving the effective positioning between the substrate 21 and the bottom plate 10 may also be adopted. For example, the positioning block is fixed on the bottom plate 10, and the substrate 21 is clipped into the neck.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising a bottom plate for being connected with a mounting body and an antenna body on the bottom plate;

wherein the antenna body comprises:

a substrate fixedly connected to the bottom plate; wherein a plane where the substrate is located intersects with the bottom plate;

a radiation element on the substrate; and a feeding structure configured to transmit radio frequency signals to the radiation element and/or receive radio frequency signals from the radiation element and comprising a signal electrode and a ground electrode on a surface of the substrate;

wherein the signal electrode is electrically connected to the radiation element; and on a reference plane perpendicular to the bottom plate, an orthographic projection of the ground electrode is spaced apart from an orthographic projection of the radiation element, and is entirely located between the orthographic projection of the radiation element and the bottom plate;

wherein the substrate comprises a first surface and a second surface opposite to each other;

the ground electrode comprises a first ground electrode and a second ground electrode;

the signal electrode, the first ground electrode and the second ground electrode are on the first surface; and the first ground electrode and the second ground electrode are on both sides of the signal electrode, respectively, and are spaced from the signal electrode;

wherein the radiation element is a radiation patch on the first surface;

a first terminal of the signal electrode is electrically connected to the radiation patch;

a second terminal of the signal electrode extends to a position close to the bottom plate along a first direction; and the radiation patch and the ground electrode are spaced from each other along the first direction; and wherein the radiation patch comprises a first edge, a second edge, and a third edge on a side of the radiation patch close to the ground electrode and connected in sequence;

the signal electrode is electrically connected to the second edge;

the first ground electrode comprises a fourth edge facing toward the first edge in the first direction;

the second ground electrode comprises a fifth edge facing toward the third edge in the first direction;

wherein in a second direction perpendicular to the first direction, a distance between the first edge and the fourth edge gradually increases along a direction away from the signal electrode, and a distance between the third edge and the fifth edge gradually increases along a direction away from the signal electrode.

2. The antenna of claim 1, wherein the first edge and the fourth edge are both disposed obliquely in opposite directions with respect to the second direction; and/or the third edge and the fifth edge are both disposed obliquely in opposite directions with respect to the second direction.

3. The antenna of claim 2, wherein a wavelength corresponding to a center frequency of an operating frequency band of the antenna is a reference wavelength;

a size of the radiation patch in the first direction is 0.41 to 0.45 times of the reference wavelength, and/or a size of the radiation patch in the second direction perpendicular to the first direction is 0.55 to 0.6 times of the reference wavelength.

4. The antenna of claim 2, wherein the radiation patch is divided into two parts by an extension line of a central line of the signal electrode, and the two parts are of bilateral symmetry with respect to the signal electrode;

and/or the first ground electrode and the second ground electrode are of bilateral symmetry with respect to the signal electrode.

5. The antenna of claim 1, wherein the first ground electrode further comprises a sixth edge facing toward the second edge in the first direction, and the sixth edge is parallel to the second edge; and/or the second ground electrode further comprises a seventh edge facing toward the second edge in the first direction, and the seventh edge is parallel to the second edge.

6. The antenna of claim 5, wherein a wavelength corresponding to a center frequency of an operating frequency band of the antenna is a reference wavelength;

a size of the radiation patch in the first direction is 0.41 to 0.45 times of the reference wavelength, and/or a size of the radiation patch in the second direction perpendicular to the first direction is 0.55 to 0.6 times of the reference wavelength.

7. The antenna of claim 1, wherein a wavelength corresponding to a center frequency of an operating frequency band of the antenna is a reference wavelength;

a size of the first edge in the second direction is 0.14 to 0.16 times of the reference wavelength, and/or a size of the third edge in the second direction is 0.14 to 0.16 times of the reference wavelength, and/or a size of the fourth edge in the second direction is 0.25 to 0.27 times of the reference wavelength, and/or a size of the fifth edge in the second direction is 0.25 to 0.27 times of the reference wavelength, and/or a minimum distance between the first edge and the fourth edge is 0.014 to 0.015 times of the reference wavelength, and/or a minimum distance between the third edge and the fifth edge is 0.014 to 0.015 times of the reference wavelength, and/or a maximum distance between the first edge and the fourth edge is 0.27 to 0.3 times of the reference wavelength, and/or a maximum distance between the third edge and the fifth edge is 0.27 to 0.3 times of the reference wavelength.

8. The antenna of claim 1, wherein a wavelength corresponding to a center frequency of an operating frequency band of the antenna is a reference wavelength;

a size of the radiation patch in the first direction is 0.41 to 0.45 times of the reference wavelength, and/or a size of the radiation patch in the second direction perpendicular to the first direction is 0.55 to 0.6 times of the reference wavelength.

9. The antenna of claim 1, wherein the radiation patch is divided into two parts by an extension line of a central line of the signal electrode, and the two parts are of bilateral symmetry with respect to the signal electrode;

and/or the first ground electrode and the second ground electrode are of bilateral symmetry with respect to the signal electrode.

10. The antenna of claim 1, wherein the antenna is an omnidirectional antenna; and/or a polarization of the antenna is a vertical polarization.

11. The antenna of claim 1, wherein the plane where the substrate is located is perpendicular to the bottom plate; and a surface of the substrate acts as the reference plane.

12. An antenna, comprising a bottom plate for being connected with a mounting body and an antenna body on the bottom plate;

wherein the antenna body comprises:

a substrate fixedly connected to the bottom plate; wherein a plane where the substrate is located intersects with the bottom plate;

a radiation element on the substrate; and a feeding structure configured to transmit radio frequency signals to the radiation element and/or receive radio frequency signals from the radiation element and comprising a signal electrode and a ground electrode on a surface of the substrate;

wherein the signal electrode is electrically connected to the radiation element; and on a reference plane perpendicular to the bottom plate, an orthographic projection of the ground electrode is spaced apart from an orthographic projection of the radiation element, and is entirely located between the orthographic projection of the radiation element and the bottom plate;

wherein the substrate comprises a first surface and a second surface opposite to each other;

the ground electrode comprises a first ground electrode and a second ground electrode;

the signal electrode, the first ground electrode and the second ground electrode are on the first surface; and the first ground electrode and the second ground electrode are on both sides of the signal electrode, respectively, and are spaced from the signal electrode, wherein the radiation element is a radiation patch;

the substrate is transparent;

the antenna body further comprises a transparent conductive film;

the transparent conductive film comprises a metal conductive layer, a transparent substrate layer and a transparent adhesive layer sequentially stacked;

wherein the metal conductive layer is etched to form the radiation patch, the signal electrode, and the ground electrode in a mesh, so that the radiation patch, the signal electrode, and the ground electrode are all transparent; and the transparent adhesive layer is used for adhering with the first surface and/or the second surface of the substrate.

13. The antenna of claim 12, wherein a thickness of the metal conductive layer is in a range of 1 micron to 10 microns, and/or a line width of the mesh formed by the metal conductive layer is in a range of 2 microns to 30 microns, and/or a line spacing of the mesh formed by the metal conductive layer is in a range of 50 microns to 200 microns.

14. The antenna of claim 12, further comprising a signal transmission structure, which penetrates from a side of the bottom plate close to the mounting body to a side of the bottom plate where the antenna body is disposed;

wherein the signal transmission structure comprises a first conductive portion and a second conductive portion insulated from each other;

the metal conductive layer is etched to remain a first solid metal portion and a second solid metal portion, which are electrically connected to the signal electrode and the ground electrode, respectively;

the first conductive portion electrically cooperates with the first solid metal portion to enable the signal electrode to transmit radio frequency signals; and the second conductive portion electrically cooperates with the second solid metal portion to enable the ground electrode to be grounded.

15. The antenna of claim 12, further comprising an outer cover and a fixing structure;

wherein the outer cover is covered above the bottom plate and is covered on outside of the antenna body; and the fixing structure is used for connecting the antenna body with the bottom plate, and/or for connecting the outer cover with the bottom plate, and/or for connecting the bottom plate with the mounting body;

wherein the bottom plate, the outer cover and the fixing structure are all transparent.

16. The antenna of claim 15, wherein the fixing structure comprises an antenna body positioning element and a fastener;

the antenna body positioning element comprises a first connection portion and a second connection portion with an angle therebetween;

the first connection portion is connected to the first surface and/or the second surface of the substrate through the fastener, and the second connection portion is connected to the bottom plate through the fastener.

* * * * *